(12) United States Patent
Shimoda et al.

(10) Patent No.: US 6,914,603 B2
(45) Date of Patent: Jul. 5, 2005

(54) IMAGE GENERATING SYSTEM (75) Inventors: Junya Shimoda, Kanagawa (JP); Hiroshi Yamamoto, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 241 days.

(21) Appl. No.: 09/896,148

(22) Filed: Jun. 29, 2001

(65) Prior Publication Data

US 2002/0033822 A1 Mar. 21, 2002

(30) Foreign Application Priority Data

Jul. 3, 2000 (JP) ........................................ 2000-200784

(51) Int. Cl.$^7$ .............................................. G06T 15/00
(52) U.S. Cl. ...................................... 345/427; 345/426
(58) Field of Search ................................ 345/427, 426, 345/581, 589, 600, 619

(56) References Cited

U.S. PATENT DOCUMENTS

| 5,966,134 A | 10/1999 | Arias .......................... 345/426 |
| 6,361,438 B1 * | 3/2002 | Morihira ...................... 463/31 |

FOREIGN PATENT DOCUMENTS

| EP | 1 033 682 | 9/2000 |
| EP | 1 089 233 | 4/2001 |
| JP | 10-302082 | 11/1998 |
| JP | 2000-250194 | 9/2000 |
| JP | 2000-251094 | 9/2000 |
| JP | 2000-331175 | 11/2000 |
| JP | 2001-20530 | 1/2001 |
| JP | 2001-84404 | 3/2001 |
| JP | 2001-084404 | 3/2001 |
| JP | 2001-101443 | 4/2001 |
| JP | 2001-188920 | 7/2001 |
| JP | 2001-188921 | 7/2001 |
| JP | 2001-202530 | 7/2001 |
| JP | 2001-243493 | 9/2001 |
| JP | 2001-338309 | 12/2001 |
| JP | 2002-56404 | 2/2002 |
| WO | 00/72269 | 11/2000 |

OTHER PUBLICATIONS

Raskar et al., "Image Precision Silhouette Edges", 1999, pp. 135–231.*
Foley et al., "Computer Graphics: Principles and Practice", 1997, pp. 736–737.*
Lake et al., "Stylized Rendering Techniques for Scalable Real–Time 3D Animation" pp. 13–22.*
Raskar et a al., "Image Precision Silhouette Edges", Apr. 1999, pp. 1–5.*
Lake et al., "Stylized Rendering Techniques for Scalable Real–Time 3D Animation", Jun. 2000, pp. 13–22.*
Rasker; "Image Precision Silhouette Edges", Symposium on Interactive 3D Graphics 1999, p. 3.
European Search Report dated Sep. 27, 2004.
Domingo Martin, et al. Alhambra: A System for Producing 2D Animation. Computer Animation May 26, 1999 pp. 38–47.

* cited by examiner

*Primary Examiner*—Phu K. Nguyen
(74) *Attorney, Agent, or Firm*—Katten Muchin Zavis Rosenman (57) ABSTRACT

The present invention can display contours at high speed, and realize real-time three dimensional CG animation in a cel animation style. Among the surfaces constituting a 3D model, surfaces facing the back side seen from the viewpoint are shifted in their normal directions and painted with a darker color than the original surfaces.

18 Claims, 9 Drawing Sheets

| | VERTEX X | VERTEX Y | VERTEX Z | NORMAL X | NORMAL Y | NORMAL Z |
|---|---|---|---|---|---|---|
| SURFACE ① | | | | | | |
| | -0.250, | 0.375, | 1.000, | -0.50, | 0.75, | 0.00 |
| | 0.250, | 0.375, | 1.000, | 0.50, | 0.75, | 0.00 |
| | 0.250, | 0.375, | 0.000, | 0.50, | 0.75, | 0.00 |
| | -0.250, | 0.375, | 0.000, | -0.50, | 0.75, | 0.00 |
| SURFACE ② | | | | | | |
| | 0.250, | 0.375, | 1.000, | 0.50, | 0.75, | 0.00 |
| | 0.500, | 0.000, | 1.000, | 1.00, | 0.00, | 0.00 |
| | 0.500, | 0.000, | 0.000, | 1.00, | 0.00, | 0.00 |
| | 0.250, | 0.375, | 0.000, | 0.50, | 0.75, | 0.00 |
| SURFACE ③ | | | | | | |
| | 0.500, | 0.000, | 1.000, | 1.00, | 0.00, | 0.00 |
| | 0.250, | -0.375, | 1.000, | 0.50, | -0.75, | 0.00 |
| | 0.250, | -0.375, | 0.000, | 0.50, | -0.75, | 0.00 |
| | 0.500, | 0.000, | 0.000, | 1.00, | 0.00, | 0.00 |
| SURFACE ④ | | | | | | |
| | 0.250, | -0.375, | 1.000, | 0.50, | -0.75, | 0.00 |
| | -0.250, | -0.375, | 1.000, | -0.50, | -0.75, | 0.00 |
| | -0.250, | -0.375, | 0.000, | -0.50, | -0.75, | 0.00 |
| | 0.250, | -0.375, | 0.000, | 0.50, | -0.75, | 0.00 |
| SURFACE ⑤ | | | | | | |
| | -0.250, | -0.375, | 1.000, | -0.50, | -0.75, | 0.00 |
| | -0.500, | 0.000, | 1.000, | -1.00, | 0.00, | 0.00 |
| | -0.500, | 0.000, | 0.000, | -1.00, | 0.00, | 0.00 |
| | -0.250, | -0.375, | 0.000, | -0.50, | -0.75, | 0.00 |
| SURFACE ⑥ | | | | | | |
| | -0.500, | 0.000, | 1.000, | -1.00, | 0.00, | 0.00 |
| | -0.250, | 0.375, | 1.000, | -0.50, | 0.75, | 0.00 |
| | -0.250, | 0.375, | 0.000, | -0.50, | 0.75, | 0.00 |
| | -0.500, | 0.000, | 0.000, | -1.00, | 0.00, | 0.00 |

IMAGE GENERATING SYSTEM

BACKGROUND OF THE INVENTION

1. Field of the Invention

The present invention relates to three dimensional computer graphics (CG), and, in particular, to an image generating system for displaying a three dimensional (3D) model in a cel animation style.

2. Related Art Statement

Owing to the recent improvement in hardware performance, even a consumer video game machine can generate images of three dimensional CG (Computer Graphics) in real time, realizing a three dimensional CG animation.

Further, according to contents of a game or the like, it is sometimes desired to display such a three dimensional CG animation in a conventional cel animation style. In a cel animation, an image is generated by drawing lines and painting the inside of each drawing, and, as a result, a character or the like has contours. However, according to ordinary three dimensional CC, contours are not drawn. Thus, to realize display in a cel animation style, contours should be drawn in a 3D model.

A 3D model is made of, for example, a plurality of surfaces. To draw contours in such a 3D model, it is necessary to draw a line between specific surfaces, namely between a surface that faces the front side and a surface that faces the back side, seen from a viewpoint.

SUMMARY OF THE INVENTION

However, the above-mentioned method first requires information on connection between surfaces, and further it is required to check if a side shared between the adjacent surfaces is a side where a contour should be drawn, based on the information on the connection between those surfaces.

Accordingly, when the number of polygons becomes larger, more calculations are required that the calculations can not be processed in real time.

An object of the present invention is to provide an image generating system that displays contours at high speed, and accordingly, can realize cel animation style display.

The present invention provides an image generating system, comprising: a surface direction judging means for judging a direction of a surface constituting a three dimensional model, in relation to a viewpoint; and a contour generating means for shifting an original surface that faces a back side in relation to the viewpoint, in a direction of a normal, and for painting the shifted surface with a color that is darker than a color of the original surface.

Further, the present invention provides a method of generating an image, comprising steps of: judging a direction of a surface constituting a three dimensional model, in relation to a viewpoint; and shifting an original surface that faces a back side in relation to the viewpoint, in a direction of a normal, and painting the shifted surface with a color that is darker than a color of the original surface.

Further, the present invention provides a storage medium that stores an image generating program, and that program causes execution of steps of: judging a direction of a surface constituting a three dimensional model, in relation to a viewpoint; and shifting an original surface that faces a back side in relation to the viewpoint, in a direction of a normal, and painting the shifted surface with a color that is darker than a color of the original surface.

In the above-mentioned cases, the shifted surface may be generated with a different quantity of shift or a different color for each three dimensional model. And, for example, the shifted surface may be generated with a smaller quantity of shift and with a color closer to the color of the original surface, as the three dimensional model exists more distantly from a screen.

The above-mentioned program may be distributed by a portable storage medium such as a CD-ROM, a DVD-ROM, a memory card, etc. or through a network.

DETAILED DESCRIPTION

Now, embodiments of the present invention will be described in detail referring to the drawings.

First, will be described an entertainment apparatus according to the present invention. This entertainment apparatus executes an application such as a game provided from a storage medium such as a CD/DVD or through a network.

Figure 1:
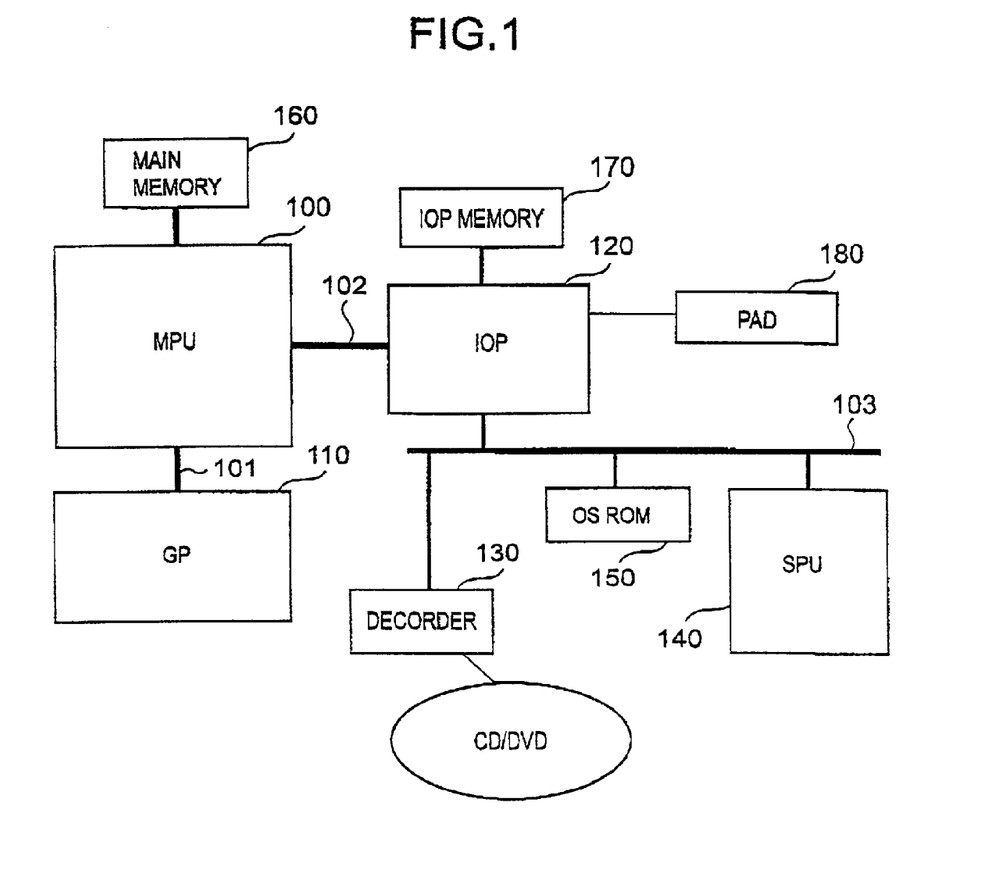
FIG. 1 is a block diagram showing a configuration of an entertainment apparatus to which the present invention is applied.

FIG. 1 is a block diagram showing a configuration of the entertainment apparatus according to the present invention.

As shown in the figure, this entertainment apparatus comprises an MPU 100, a graphics processor (GP) 110, an I/O processor (IOP) 120, a CD/DVD decoder 130, an SPU 140, an OSROM 150, a main memory 160, and an IOP memory 170.

The MPU 100 and the graphics processor 110 are connected with each other through a bus 101. The MPU 100 and the IOP 120 are connected with each other through a bus 102. Further, the IOP 120, the CD/DVD decoder 130, the SPU 140, and the OSROM 150 are connected with a bus 103.

Further, the MPU 100 is connected with the main memory 160, and the IOP 120 is connected with the IOP memory 170. Further, the IOP 120 is connected with a controller (PAD) 180.

The MPU 100 is a main CPU of this entertainment apparatus. The MPU 100 executes a program stored in the OSROM 150 or a program loaded onto the main memory 160 from a CD or DVD, to perform certain processing.

The graphics processor 110 is an image generating processor that realizes the rendering function of the present entertainment apparatus. The graphics processor 110 performs image generation, on the instructions of the MPU 100.

The IOP 120 is an input-output sub processor that controls data transmission and reception between the MPU 100 and a peripheral device (the CD/DVD decoder 130, the SPU 140, or the like).

The CD/DVD decoder 130 reads data from a CD or DVD mounted in a drive, and transfers the data to the main memory 160.

The SPU 140 is a sound reproducing processor, and reproduces sound data (such as PCM data) stored in a sound buffer (not shown) at a predetermined sampling frequency, on a sound-producing instruction of the MPU 100.

The OSROM 150 is a ROM that stores programs executed by the MPU 100 and IOP 120 at the time of the starting.

The main memory 160 is the main memory for the MPU 100, and stores instructions executed by the MPU 100, data used by the MPU 100, and the like.

The IOP memory 170 is a main memory for the IOP 120, and stores instructions executed by the IOP 120, data used by the IOP 120, and the like.

The controller (PAD) 180 is an interface for transmitting a player's intention to an application or the like during execution of a game or the like.

Figure 2:
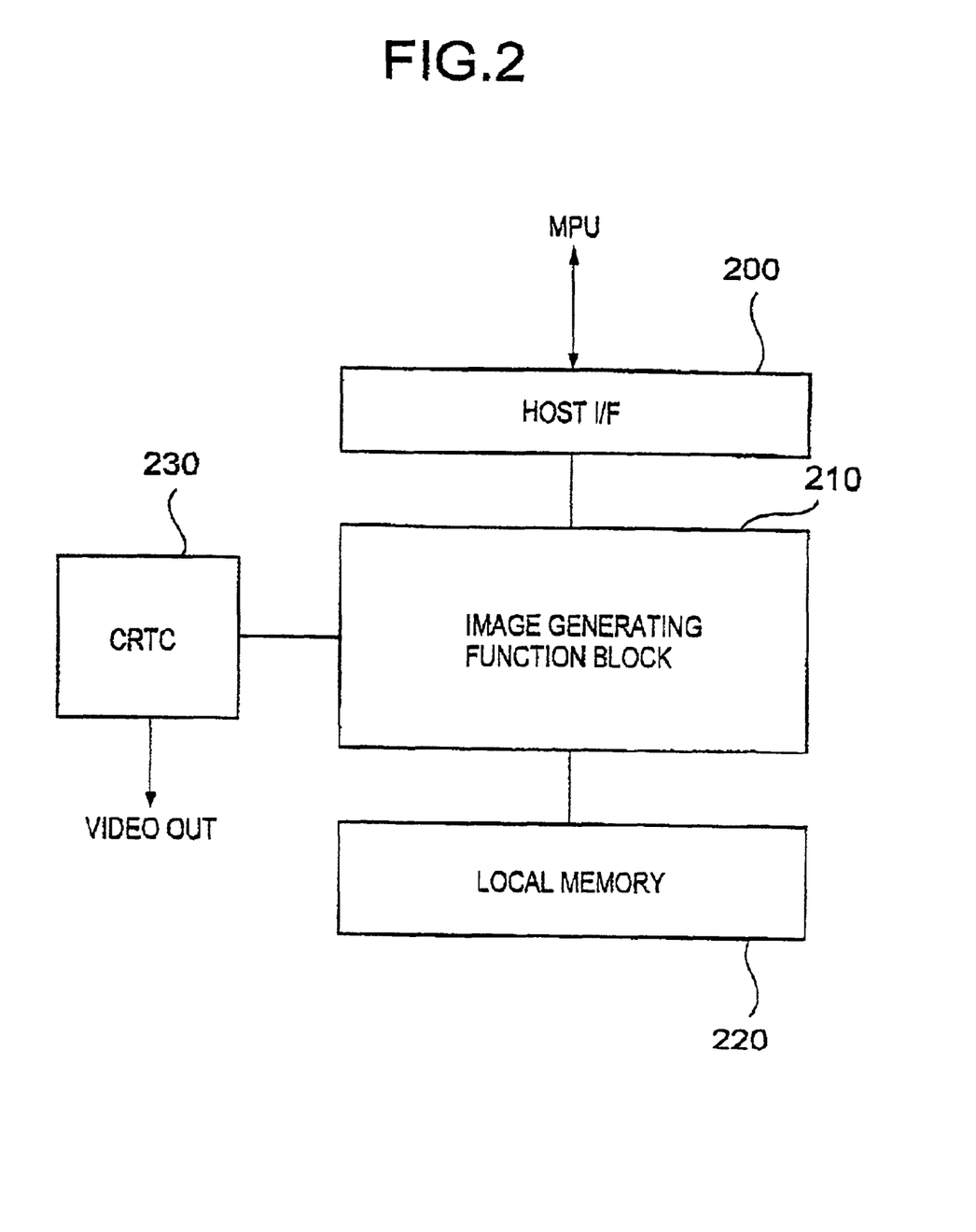
FIG. 2 is a diagram showing internal structure of a graphics processor 110.

FIG. 2 is a diagram showing internal structure of the graphics processor 110. As shown in the figures the graphics processor 110 comprises a host interface 200, an image generating function block 210, a local memory 220, and a CRTC part 230.

The host interface 200 is an interface for transmitting and receiving data to and from the MPU 100.

The image generating function block 210 is a logic circuit that performs rendering, on the instructions of the MPU 100. The image generating functional block 210 comprises sixteen digital differential analyzers (DDA) and sixteen pixel engines, to parallelly process 16 pieces (at maximum) of 64 bits pixel data (32 bits of color information and 32 bits of a Z value). The DDA calculates RGB values, a Z value, a texture value, etc. Based on such data, the pixel engine generates final pixel data.

The local memory 220 stores pixel data generated by the image generating function block 210, texture data transferred from the MPU 100, and the like.

The CRTC part 230 outputs contents of a frame buffer area in the local memory 220, as a picture signal of a designated output format (NTSC, PAL, VESA format, or the like).

Figure 3:
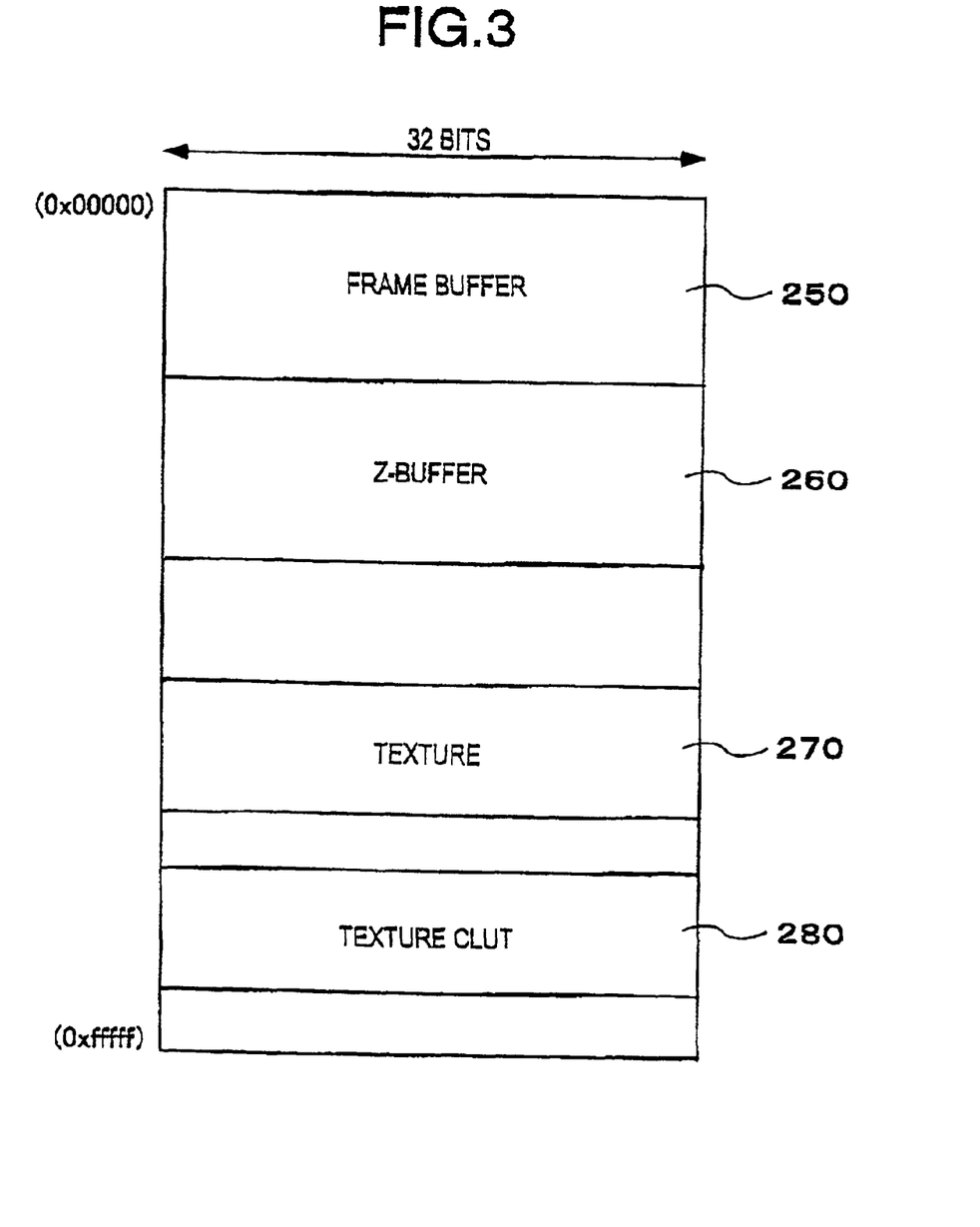
FIG. 3 is a diagram showing structure of a local memory 220.

FIG. 3 is a diagram showing structure of the local memory 220. As shown in the figure, the local memory 220 comprises the frame buffer area 250, a Z-buffer area 260, a texture buffer area 270, and a texture CLUT area 280.

The frame buffer area 250 and the Z-buffer area 260 are object areas for image generation in the meaning that the frame buffer area 250 stores pixel data as a result of image generation, and the Z-buffer area 260 stores Z values as a result of the image generation.

The texture buffer area 270 stores image data of texture, and the texture CLUT area 280 stores a color look-up table (CLUT) used when texture is an index color.

Here, the areas 250–280 can be freely arranged at any addresses in any order in the local memory 220, by setting suitable values into a prescribed control register.

Next, will be described image generation of a 3D model that is performed by the entertainment apparatus having the above-described structure. An application performs image generation based on a 3D model that is stored in a CD/DVD if necessary. In the following, description is given with respect to a case where the present invention is applied to a polygon model. However, the present invention can be applied just similarly to a spline model.

In the following, is discussed a case where contours are displayed for a hexagonal prism shown in FIG. 4. As shown in the figure, the hexagonal prism 40 consists of six surfaces ①–⑥. Here, for the sake of clarification, the figure shows contours of the polygon.

Figure 4:
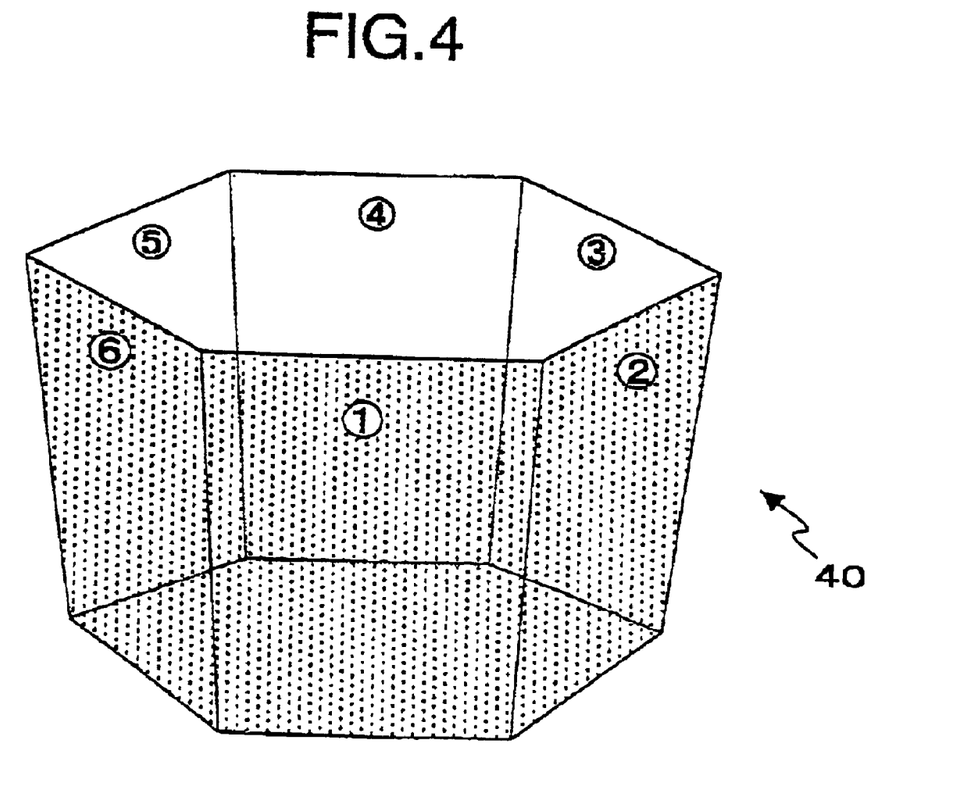
FIG. 4 is a view showing an example of a 3D model.
Figure 5:
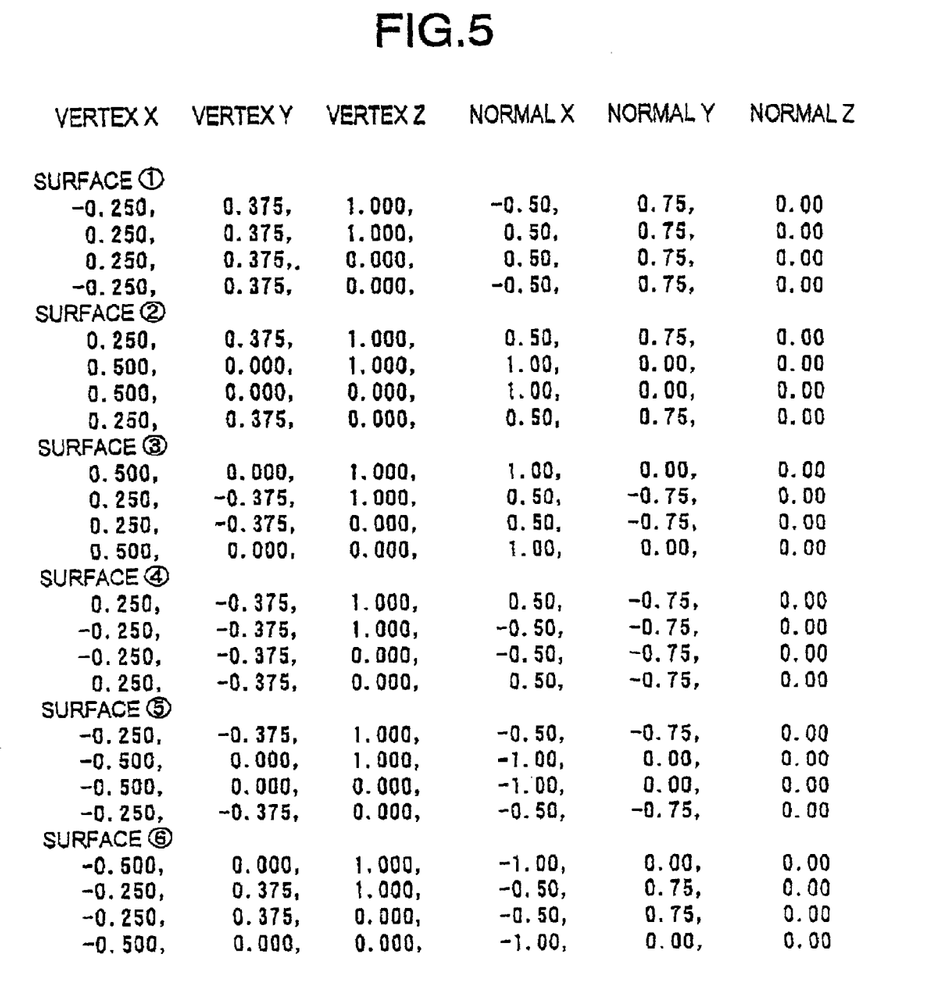
FIG. 5 is a table showing data structure of the 3D model.

FIG. 5 is a table showing an example of data structure of a 3D model as shown in FIG. 4. FIG. 5 shows data structure of a 3D model for a hexagonal prism having a diameter (width in the x-direction) 1 and height 1. Here, it is assumed that the x-axis is directed toward the right in the figure, the y-axis is directed in the protruding direction from the figure, and the z-axis is directed upward in the figure.

As shown in the figure, the 3D model data includes (x, y, z) coordinates of vertices of the surfaces ①–⑥ that constitute the 3D model, and (x, y, z) components of a normal vector at each vertex.

Figure 6:
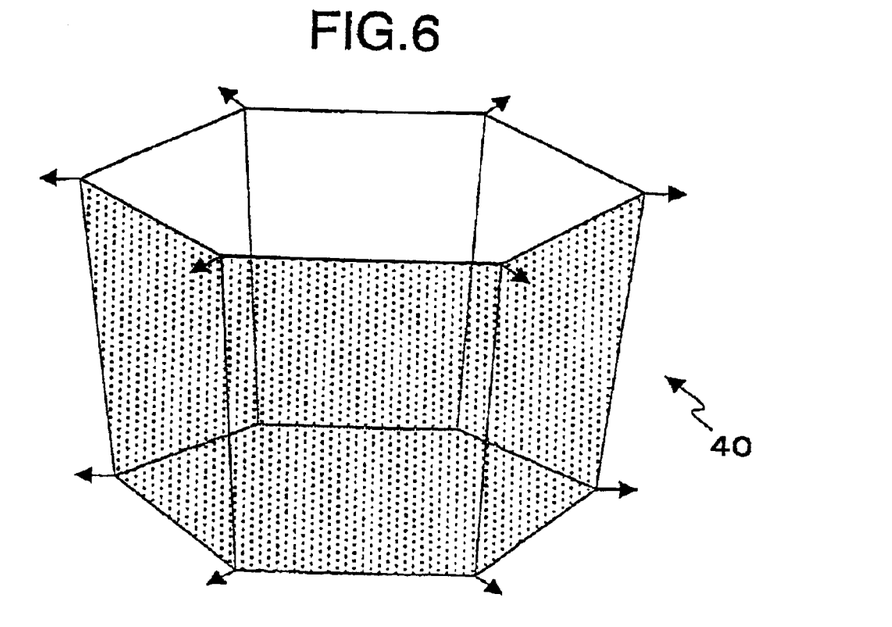
FIG. 6 is a view showing a state of respective normal vectors at vertices of the 3D model.

Thus, generally, a 3D model is accompanied with normal (vector) information that indicates directions of the surfaces constituting the model. Here, Gouraud shading is employed as a method of shading. Accordingly, a normal existing at each vertex is an average of normals of the surfaces that abut the vertex in question. FIG. 6 is a view showing a state of respective normal vectors at vertices of the hexagonal prism 40.

When such a 3D model is to be displayed on a display screen, the MPU 100 transforms the coordinates of each vertex, based on the viewpoint or the like that corresponds to input from the controller 180, and instructs the graphics processor 110 to generate an image of each surface constituting the 3D model, while specifying color of each vertex, a shading method to be employed, and the like.

Next, will be described the method of generating contours according to the present invention. The present method utilizes the normal information of the 3D model and surfaces facing the back side seen from a viewpoint, in order to display the contours.

First, in the present method, the surfaces that face the back side seen from the viewpoint are shifted in the directions of their normal vectors, respectively.

Figure 7:
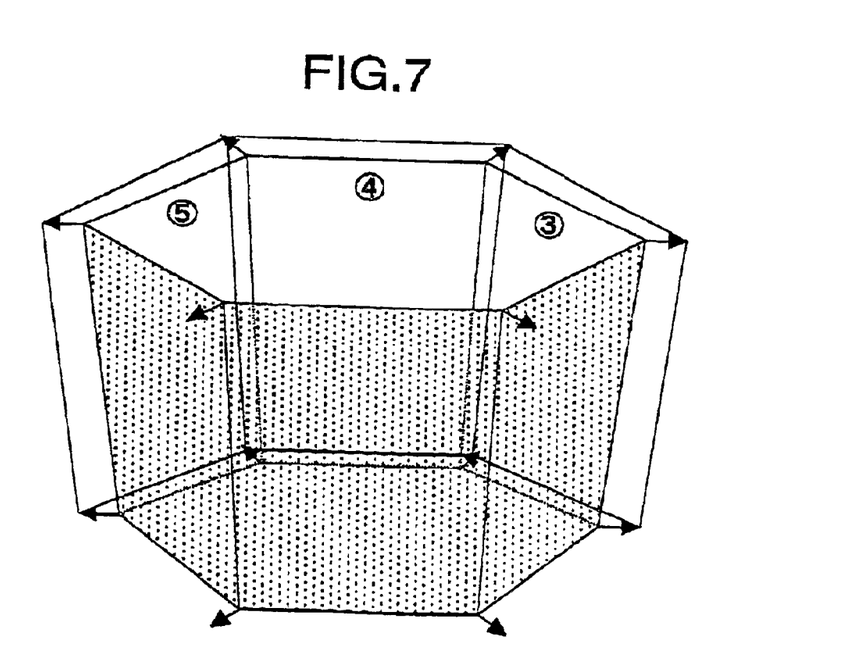
FIG. 7 is a view showing a state in which surfaces facing the back side are shifted in the directions of the normals.

FIG. 7 is a view showing a state in which the surfaces facing the back side are shifted in the directions of their normals. As shown in the figure, in this example, the surfaces ③, ④, and ⑤ are surfaces facing the back side, and those surfaces ③, ④, and ⑤ are shifted in their normal directions.

Then, the shifted surfaces are painted with a suitable color (for example, black). This generates display, just as if the contours of the model were drawn. When the surfaces to be shown like the counters are painted not with black but with a color that is darker to some degree (for example, about 50%) than the color of the original surfaces to be shown, contours of soft coloring can be displayed, realizing soft presentation.

Figure 8:
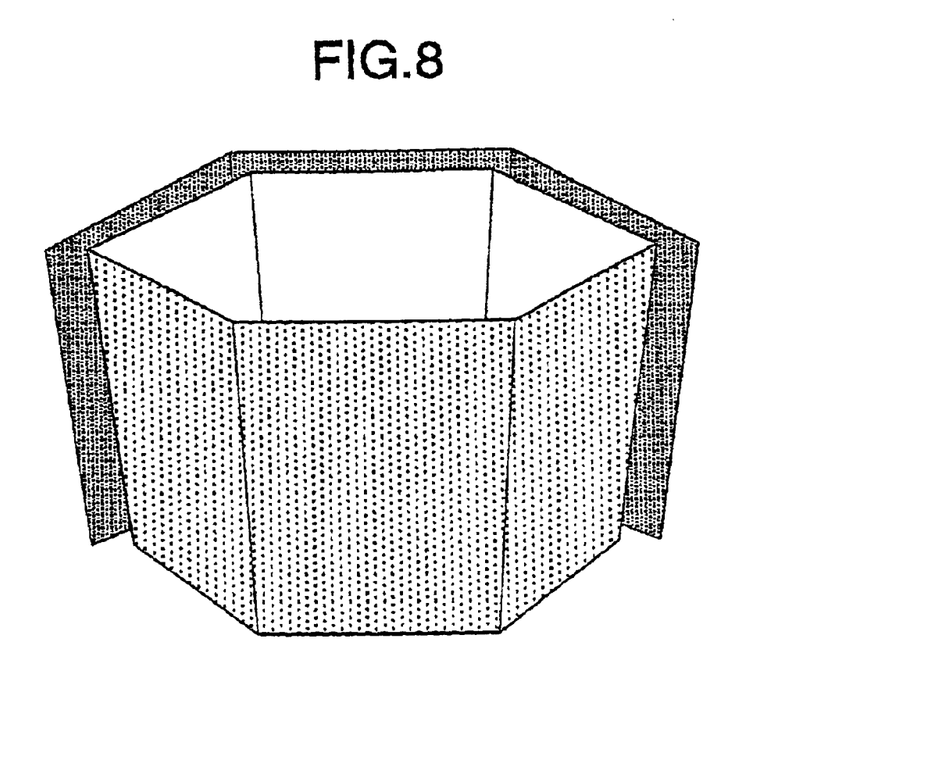
FIG. 8 is a view showing a state in which shifted surface are painted with a darker color.

FIG. 8 is a view showing a state in which the shifted surfaces are painted with a darker color. In the present embodiment, hidden surfaces are removed by a rendering method using the Z-buffer. As a result, the surfaces that are shifted in their normal directions and painted with the darker color are, in fact, painted only in their parts that extend out of the surfaces existing in the foreground. Thus, display is generated as if the contours were drawn on the screen.

Further, since the present method generates the image according to the directions of the surfaces (directions of their normals), the widths of the contours depend on the directions of the surfaces.

Figure 9A:
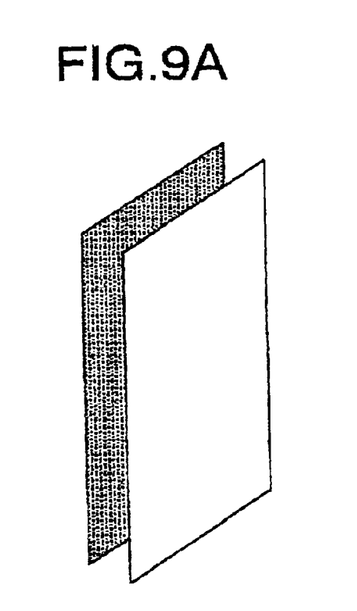
FIGS. 9A and 9B are views showing how thicknesses of the contours change according to the direction of a surface.
Figure 9B:
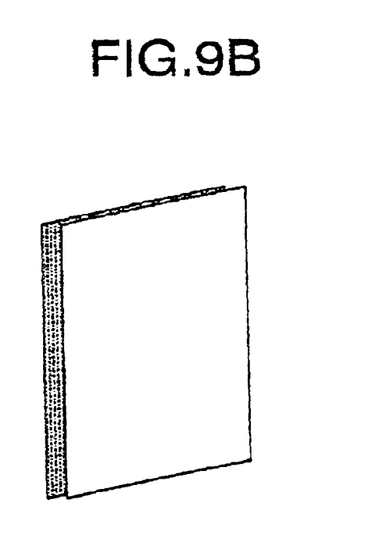

FIG. 9 is a view showing how thicknesses of the contours change according to the direction of a surface. As seen in the figure, FIG. 9A shows the thicker contours than FIG. 9B. Thus, thicknesses of the contours included in one object are not uniform. As a result, it is possible to generate lines of various thicknesses, looking like handwritten lines.

Further, it is possible also to intentionally change thickness of contours, by multiplying values of normal vectors, which are used for shifting surfaces in the directions of their normals, by a predetermined coefficient. For example, multiplication by 2 makes the thicknesses of the contours twofold, and multiplication by 0.5 makes the thicknesses half.

In other words, the present method can change coloring and thicknesses of contours by Simple calculation, and thus, real-time control can be realized.

The above-described techniques can be used in such a manner that, for example, a 3D model existing more distantly from the screen has thinner contours and has a color closer to the original surface color. As a result, it is possible to provide expression in which the more distant a 3D model is, the more it matches the background.

Figure 10:
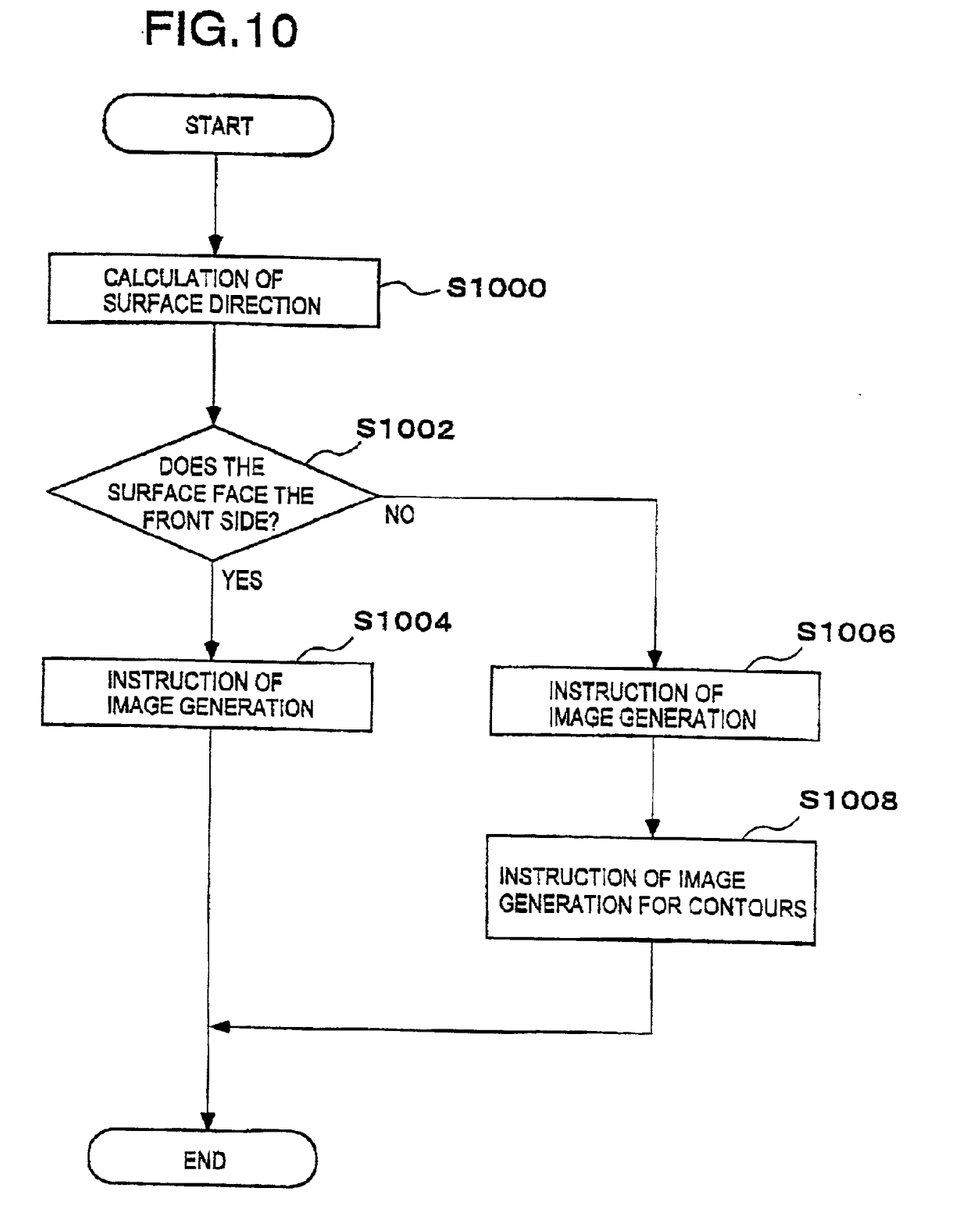
FIG. 10 is a flowchart showing the flow of image generation for a 3D model.

FIG. 10 is a flowchart showing the flow of the above-described image generation. This processing is executed by the MPU 100.

First, one surface is selected as an object of image, processing out of the surfaces constituting a 3D model as an object of image processing, and calculates a direction of that surface (S1000).

Next, it is judged if the surface, i.e., the object of the image processing, faces toward the screen (viewpoint) or not (S1002).

As a result, when the surface as the object of the image processing faces toward the screen (S1002: YES), then, an instruction is given to the graphics processor 110 to simply generate an image of that surface (S1004).

On the other hand, when the surface as the object of the image processing faces in the opposite direction to the screen (S1002: NO), then, an instruction is given to the graphics processor 110 to simply generate an image of that surface (S1006), and, in addition, an instruction is given to the graphics processor 110 to generate an image of a surface used for displaying contours (S1008). Namely, instructions are given to the graphics processor 110 to generate a surface defined by vertices obtained by adding (normals×the thickness coefficient of the lines) to the vertices defining the surface as the present object of the image processing, and to paint the generated surface with a color obtained by (the color of the original surface×the color coefficient of the lines).

Here, when all (or almost of) 3D models have closed shapes (i.e., shapes whose inner surfaces can not be seen), the simple image generation processing S1006 of the surfaces facing backward can be omitted.

Performing the above-described processing for every surface constituting the 3D model, a resultant image having contours can be obtained.

Figure 11:
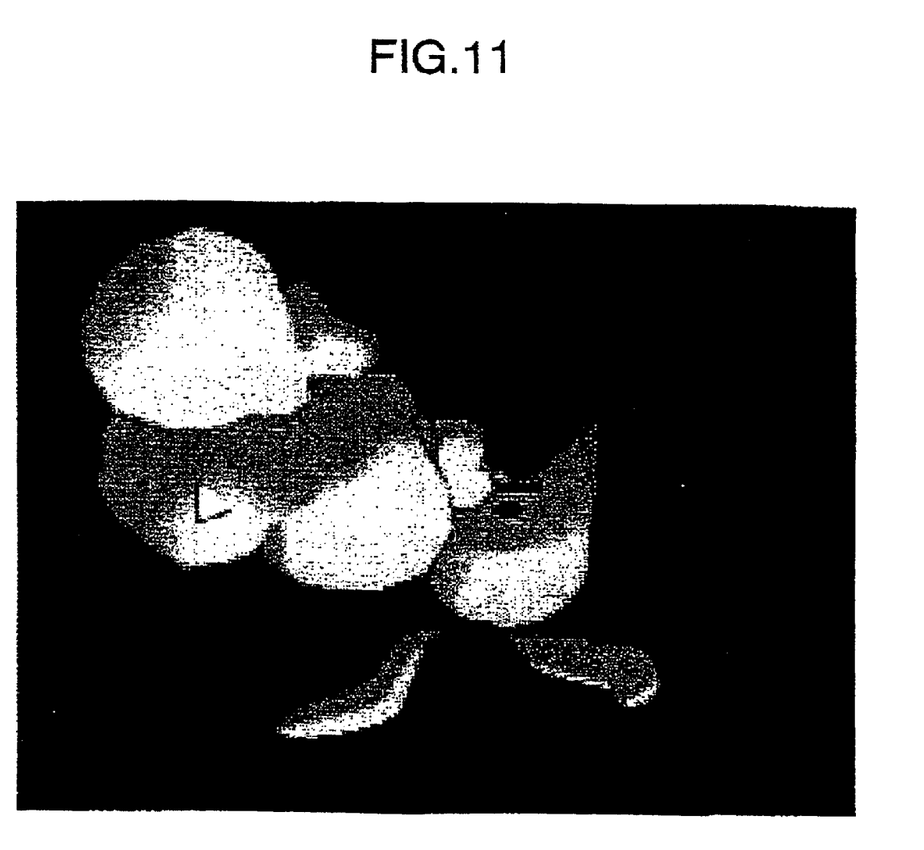
FIG. 11 is a view showing an example of an image generated by the image generating method according to the present invention.

FIG. 11 is a view showing an example of an image generated by the present method of image generation. As shown in the figure, a character is displayed, being accompanied with contours, and thus, giving a display screen like a cel animation.

According to the above-described method of image generation, every calculation can be performed for one surface at a time, without requiring consideration of another surface. Thus, a storage area for expressing correlation between surfaces is not necessary, and it is not required to check a relation between surfaces. Accordingly, the present method of image generation can realize high speed generation of contours.

As described above in detail, the present invention can realize high speed display as if accompanied by contours, Accordingly, real-time three dimensional CG animation in a cel animation style can be realized, for example.

What is claimed is:

1. An image generating system, comprising:
    a polygon direction judging means for judging a direction of a polygon constituting a three dimensional model, in relation to a viewpoint; and
    a contour generating means for shifting vertices of a first polygon that face a back side in relation to the viewpoint, in a direction of a normal, for generating a second polygon by connecting said vertices thus shifted, and for painting said second polygon with a color that is darker than a color of said first polygon;
    wherein the normal for each of the vertices of the first polygon is determined as an average of normals for each of a plurality of surfaces of the first polygon that abuts the vertex.

2. The image generating system according to claim 1, wherein:
    said contour generating means can generate said second polygon with a different quantity of shift for each three dimensional model.

3. The image generating system according to claim 2, wherein:
    said contour generating means can generate said second polygon with a smaller quantity of shift and with a color closer to the color of said first polygon, as the three dimensional model exists more distantly from the screen.

4. The image generating system according to claim 1, wherein:
    said contour generating means can paint said second polygon with a different color for each three dimensional model.

5. The image generating system according to claim 4, wherein:
    said contour generating means can generate said second polygon with a smaller quantity of shift and with a color closer to the color of said first polygon, as the three dimensional model exists more distantly from the screen.

6. The image generating system according to claim 1, wherein:
    said contour generating means can generate said second polygon with a smaller quantity of shift and with a color closer to the color of said first polygon, as the three dimensional model exists more distantly from the screen.

7. A method of generating an image, comprising steps of:
    judging a direction of a polygon constituting a three dimensional model, in relation to a viewpoint; and shifting vertices of a first polygon that face a back side in relation to the viewpoint each in a direction of a normal, generating a second polygon by connecting said vertices thus shifted, and painting said second polygon with a color that is darker than a color of said first polygon;

wherein the normal for each of the vertices of the first polygon is determined as an average of normals for each surface of the first polygon that abuts the vertex.

8. A method of generating an image according to claim 7, wherein:

said second polygon is generated with a different quantity of shift for each three dimensional model.

9. A method of generating an image according to claim 7, wherein:

said second polygon is generated with a different color for each three dimensional model.

10. A method of generating an image according to claim 7, wherein:

said second polygon is generated with a smaller quantity of shift and with a color closer to the color of said first polygon, as the three dimensional model exists more distantly from the screen.

11. A storage medium that stores an image generating program, wherein said program causes a computer, which has read said program, to execute processes of:

judging a direction of a polygon constituting a three dimensional model, in relation to a viewpoint; and shifting vertices of a first polygon that face a back side in relation to the viewpoint, each in a direction of a normal, generating a second polygon by connecting said vertices thus shifted, and of painting said second polygon with a color that is darker than a color of said first polygon;

wherein the normal for each of the vertices of the first polygon is determined as an average of normals for each of a plurality of surfaces of the first polygon that abuts the vertex.

12. A storage medium storing the computer program for generating images according to claim 11, wherein:

said second polygon is generated with a different quantity of shift for each three dimensional model.

13. A storage medium storing the computer program for generating images according to claim 11, wherein:

said second polygon is generated with a different color for each three dimensional model.

14. A storage medium storing the computer program for generating images according to claim 11, wherein:

said second polygon is generated with a smaller quantity of shift and with a color closer to the color of said first polygon, as the three dimensional model exists more distantly from the screen.

15. A computer program for causing a computer, which has read said program, to execute processes of:

judging a direction of a polygon constituting a three dimensional model, in relation to a viewpoint; and shifting vertices of a first polygon that face a back side in relation to the viewpoint, each in a direction of a normal, generating a second polygon by connecting said vertices thus shifted, and of painting said second polygon with a color that is darker than a color of said first polygon;

wherein the normal for each of the vertices of the first polygon is determined as an average of normals for each of a plurality of surfaces of the first polygon that abuts the vertex.

16. A computer program according to claim 15, wherein:

said second polygon is generated with a different quantity of shift or each three dimensional model.

17. A computer program according to claim 15, wherein:

said second polygon is generated with a different color for each three dimensional model.

18. A computer program according to claim 15, wherein:

said second polygon is generated with a smaller quantity of shift and with a color closer to the color of said first polygon, as the three dimensional model exists more distantly from the screen.

* * * * *